United States Patent Office 3,799,921
Patented Mar. 26, 1974

3,799,921
N¹-ACYL-2-PHENYLHYDRAZINO-2-IMIDAZOLINES AND PROCESSES FOR THEIR PREPARATION AND USE
Knut Zellerhoff, Wuppertal-Elberfeld, Siegismund Schutz, Metzkausen, and Wilhelm Stendel, Wuppertal-Elberfeld, Germany, assignors to Bayer Aktiengesellschaft, Leverkusen, Germany
No Drawing. Filed Aug. 19, 1971, Ser. No. 173,291
Claims priority, application Germany, Aug. 22, 1970, P 20 41 732.7
Int. Cl. C07c 49/34
U.S. Cl. 260—240 J    40 Claims

ABSTRACT OF THE DISCLOSURE

Phenylhydrazino-2-imidazoline derivatives bearing an acyl group in the N¹-position are acaricidal agents. The compounds, of which 2-(N¹-propionyl-N²-phenylhydrazino)-2-imidazoline is a typical embodiment, are prepared by treating the appropriate phenylhydrazino-2-imidazoline with an acylating agent.

DETAILED DESCRIPTION

The present invention pertains to certain derivatives of phenylhydrazino-2-imidazolines and their salts, to process for their production, to their use as acaricides, and to compositions adapted for this use.

In particular the invention provides compounds of the formula:

(I)

wherein $R^1$ is hydrogen, alkyl of 1 to 17 carbon atoms, unsubstituted or substituted by fluoro, chloro, bromo, hydroxy, lower alkoxy, lower alkylthio, aryl, aryloxy or arylthio; alkenyl of 3 to 10 carbon atoms, cycloalkyl of 3 to 6 carbon atoms; furyl; or aryl, unsubstituted or substituted by fluoro, chloro, bromo, nitro, carboxy, lower alkanoyl, hydroxy, lower alkoxy, lower alkyl, lower alkenyl, arylamino, lower alkylamino, di(lower alkyl)amino or lower alkamido.

$R^2$ is hydrogen, fluoro, chloro, bromo, nitro, amino, carboxy, lower alkanoyl, hydroxy, lower alkoxy, lower alkyl or trifluoromethyl, $n$ has a value of 1 to 3, and the physiologically acceptable acid addition salts thereof.

A preferred group of compounds falling within the above class are those of Formula I wherein $R^1$ is alkyl of 1 to 17 carbon atoms, unsubstituted or substituted by chloro, lower alkoxy, lower alkylthio, phenyl or phenoxy; cycloalkyl of 3 to 6 carbon atoms; phenyl; naphthyl; lower alkenyl of 3 to 10 carbon atoms; cycloalkyl of 3 to 6 carbon atoms; phenyl, biphenyl or naphthyl, said phenyl and phenoxy groups being unsubstituted or substituted by chloro, lower alkoxy, lower alkylthio or lower alkyl, and $R^2$ is hydrogen, chloro or lower alkyl.

The salts of the present invention include those of inorganic acids and of organic acids. If the compounds are to be applied as animal ectoparasiticides, it will of course be desirable that such salts should be physiologically acceptable salts, i.e. of nontoxic acids. Examples of inorganic acids include the hydrogen halides and phosphoric acid, the compounds being for example salts of hydrochloric acid or phosphoric acid respectively. Suitable organic acids include nontoxic carboxylic and sulfonic acids. When employed in the present specification and claims, the term "lower alkyl" refers to a straight or branched hydrocarbon chain of from 1 to 6 carbon atoms, preferably 1 to 4 carbon atoms, such as methyl, ethyl, propyl, isopropyl, n-butyl, tert. butyl, pentyl, hexyl and the like. The term "lower alkoxy" refers to such groups bound to the remainder of the molecule through an oxygen ether bond such as methoxy, ethoxy, propoxy, butoxy and the like. The term "lower alkylthio" refers to the corresponding thioethers such as methylthio, ethylthio, propylthio, etc. The term "lower alkenyl" refers to a hydrocarbon chain of from 2 to 6 carbon atoms bearing at least one non-terminal ethylenic double bond such as allyl, 2,2-dimethylvinyl, crotyl and the like. Aryl refers to an aromatic group of 6 or 12 carbon atoms such as phenyl, biphenyl or naphthyl while aryloxy refers to the corresponding groups bound to the remainder of the molecule through an oxygen ether bond. Cycloalkyl of 3 to 6 carbon atoms includes cyclopropyl, cyclobutyl, cyclopentyl and cyclohexyl.

The compounds of this invention are outstandingly suitable for combatting acarids, especially animal ectoparasites. In contrast to the unsubstituted phenylhydrazino-2-imidazoline (see for example J. Chem. Soc. 1965, 474–79), a distinct activity against ticks, especially against resistant ticks (towards agents heretofore used), can be observed with the compounds according to the invention.

The invention also provides a process for the production of a compound according to the invention in which a phenylhydrazino-2-imidazoline, described for example in U.S. Pat. No. 3,480,630, of the following formula:

(II)

in which $R^2$ has the abovementioned meaning, or a salt thereof is allowed to react with a carboxylic acid derivative of the formula:

$$R^1—CO—X \quad (III)$$

in which $R^1$ is as defined above, and

X is (a) fluoro, chloro, bromo or azido ($N_3$), (b) a lower alkoxy, lower alkylthio, aryloxy, arylthio, acyloxy or acylthio group, or (c) hydroxy or mercapto.

In process variant (a), i.e. when X is fluoro, chloro, bromo or azido, the reaction can optionally be executed in the presence of a base such as an alkali metal hydroxide, an alkali metal carbonate or a tertiary organic base, optionally with exclusion of oxygen, generally at temperatures of from −20 to about 120° C., preferably at temperatures of 0 to 50° C., and optionally in water or organic solvents. In many cases it is advantageous to work in two-phase systems, which can, for example, consist of a water-immiscible solvent such as chloroform, halogenated hydrocarbons or aromatic hydrocarbons, and an aqueous phase such as water.

In process variant (b), i.e. when X is lower alkoxy, lower alkylthio, aryloxy, arylthio, acyloxy or acylthio, the reaction can be carried out with or without a solvent, generally at temperatures of from about 0 to about 140°

C., preferably 30 to 100° C. The addition of alkali metal alcoholates in approximately equimolar amounts is advantageous in some cases.

In process variant (c), i.e. when X is hydroxy or mercapto, the reaction is generally carried out at temperatures of from about 0 to about 120° C., preferably at 30 to 100° C., optionally using a condensation agent such as, for example, a carbodiimide of the formula:

$$R-N=C=N-R \qquad (VI)$$

in which R is a straight-chain, branched or cyclic hydrocarbon radical such as cyclohexyl or isopropyl.

The phenylhydrazino-2-imidazolines of the present invention, when manufactured according to the process described above, are obtainable in excellent yield and purity. They are colorless solids and form salts with hydrogen halides or phosphoric acid or acid phosphates such as $NaH_2PO_4$ or $Ca(H_2PO_4)_2$ or sulfuric acid, as well as with organic carboxylic acids and sulfonic acids. These salts can be employed in the same way as the free bases in the use according to the invention, provided of course that the acids used for salt formation are toxicologically harmless when applied to animals to free them or protect them from ectoparasites, i.e. the salts are physiologically acceptabe.

It can be shown by chemical and spectroscopic methods that the products obtained by the present process possess the same structure as in Formula I and that substitution does not occur at the other nitrogen atoms of the molecule or only occurs to a minor extent.

The compounds display strong acaricidal properties, especially towards those acarids which attack domesticated animals, such as cattle and sheep, as ectoparasites. They are therefore very suitable for combatting animal ectoparasites of the order of the acarids. As economically important ectoparasites of this nature, which play a major role especially in tropical and sub-tropical countries, there may for example be mentioned the Australian and South American cattle tick, *Boophilus microplus*, the South African cattle tick, *Boophilus decoloratus*, and multi-host cattle ticks and sheep ticks of the genera Rhipicephalus, Amblyomma and Hyalomma, all from the family Ixodidae, representatives of the family Sarcoptidae, such as the sheet scab mite, *Psoroptes ovis*, and the rabbit ear mite, *Psoroptes cuniculi*.

Over the course of time, ticks have, in various areas, become resistant towards the phosphoric acid esters and carbamates hitherto used for combatting them, so that the success in combatting them has become doubtful in many areas. To ensure economical animal raising in the areas where attack occurs, acaricidal agents which are effective against resistant strains, for example those encountered in the genus Boophilus, are desired. For example, in Australia the Ridgeland strain and the Biarra strain of *Boophilus microplus* have become highly resistant to the phosphoric acid esters and carbamates hitherto used. The phenylhydrazino-2-imidazoline derivatives of the present invention prove to be equally effective both against the normally sensitive strains and against the resistant strains. They greatly inhibit the deposition of eggs by the adult forms and lead to a rapid dropping off of all tick stages present on the animal.

The phenylhydrazino-2-imidazoline derivatives of the present invention can be conveniently employed in acaricidal formulations, such as solutions, emulsions, suspensions, powders, pastes and granulates. These can be produced in the usual fashion, as for example by mixing the phenylhydrazino-2-imidazoline derivatives with extenders, that is, liquid, solid or liquefied gaseous diluents or carriers, optionally with the use of surface-active agents, such as emulsifying agents or dispersing agents. Suitable liquid diluents or carriers include aromatic hydrocarbons such as xylenes, toluene, benzene or alkylnaphthalenes; chlorinated aromatic or aliphatic hydrocarbons such as chlorobenzenes, chloroethylenes or methylene chloride; aliphatic hydrocarbons such as cyclohexane, paraffins, as for example mineral oil fractions; alcohols such as butanol or glycol; the corresponding ethers and esters; ketones such as acetone, methyl ethyl ketone, methyl isobutyl ketone or cyclohexanone; strongly polar solvents such as dimethylformamide, dimethylsulfoxide and acetonitrile; and water. In the case of the use of water as an extender, organic solvents can also be used as auxiliary solvents.

Liquefied gaseous diluents or carriers include liquids which are gaseous at normal temperatures and pressures, most notably aerosol propellants such as halogenated hydrocarbons, e.g. Freon.

Solid diluents or carriers include ground natural minerals such as kaolins, clays, talc, chalk, quartz, attapulgite, montmorillonite and diatomaceous earth, and ground synthetic minerals such as highly dispersed silicic acid, alumina and silicates.

Suitable emulsifying agents include nonionic and anionic emulsifiers such as polyoxyethylene-fatty acid esters, polyoxyethylene-fatty alcohol ethers for example alkylaryl-polyglycol ethers, alkyl sulfonates, alkyl sulfates and aryl sulfonates. Dispersing agents include lignin, sulfite waste liquors and methyl cellulose.

The compositions generally contain 0.1 to 95% by weight of the phenylhydrazino-2-imidazoline derivative, in form ready for use or to be appropriately diluted prior to actual application. Other auxiliaries or active substances, such as insecticides or disinfectants, can also be admixed with the formulations or the ready-to-use solutions.

The phenylhydrazino - 2 - imidazoline derivative, either pure compound or a composition containing the pure compound is applied in the usual manner, as for example by powdering, spraying, watering or atomizing, or as a dip.

The invention therefore provides an acaricidal composition containing as active ingredient a phenylhydrazino-2-imidazoline derivative according to the invention in admixture with a solid or liquefied gaseous diluent or carrier or in admixture with a liquid diluent or carrier containing a surface-active agent.

The invention also provided a method of combatting acarid pests, as well as a method of freeing or protecting animals from ectoparasites, which comprise applying to the pests or a habitat thereof a phenylhydrazine-2-imidazoline derivative according to the invention, alone or as a composition containing the active ingredient in admixture with a diluent or carrier.

The invention is further illustrated by the following examples, in which parts are expressed by weight and temperature is expressed in degrees centigrade.

EXAMPLE A

In vitro test on ticks/Inhibition of egg-production

Three parts of the indicated phenylhydrazino-2-imidazole derivative are mixed with seven parts of a mixture of equal parts of ethylene glycol monomethyl ether and nonylphenol polyglycol ether. The emulsion concentrate thus obtained is diluted with water to the indicated concentration. Adult fully engorged female ticks of the species *Boophilus microplus* (resistant) are dipped for one minute into this active substance preparation. After dipping 10 female specimens of each of the various tick strains, the individual ticks are transferred into plastic dishes, the bottoms of which are covered with filter paper discs. After 28 days, the effectiveness of the active substance preparation is assessed by determining the inhibition of the deposition of fertile eggs, as compared to the deposition of eggs of untreated control ticks. The effect is indicated in percent, 100% denoting that no fertile eggs were laid and 0% denoting that the ticks laid eggs corresponding to the untreated control.

The results are shown in the table:

TABLE.—IN VITRO TEST ON TICKS (INHIBITION OF EGG-PRODUCTION)

| Active substance | Concentration causing inhibition of egg-production of *Boophilus microplus* (Biarra strain) at— | |
|---|---|---|
| | 100% inhibition | >50% inhibition |
| 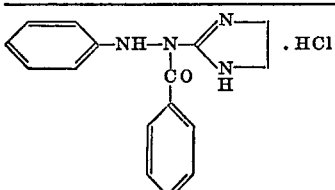 | 0.3 | 0.2 |
| 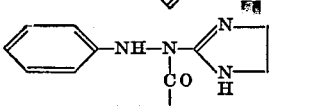 | 0.1 | 0.03 |
| 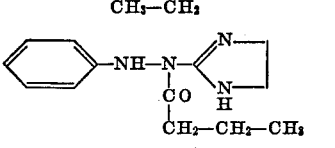 | 1.0 | 0.3 |
| 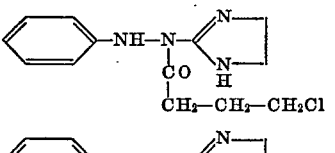 | 0.1 | 0.02 |
| 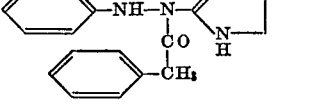 | 0.03 | 0.02 |
| 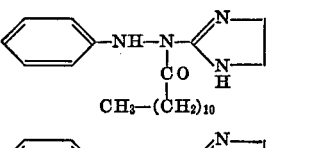 | 1.0 | 0.3 |
| 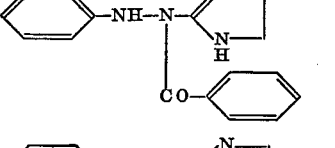 | 0.3 | 0.2 |
| 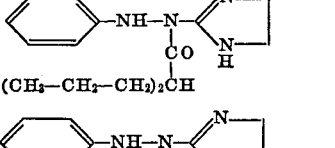 | 0.3 | 0.1 |
| 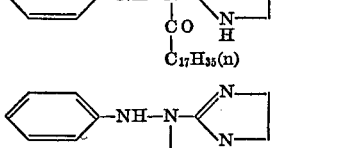 | ---------- | 1.0 |
| 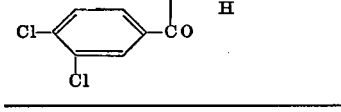 | 0.1 | 0.03 |

EXAMPLE 1

A suspension of 25.7 g. of 2-(N²-phenylhydrazino)-2-imidazoline hydrobromide (0.1 mol) in 250 ml. of chloroform was mixed, under nitrogen, with 25 ml. of 45 percent strength sodium hydroxide solution and 20 ml. of water, and after the solid had dissolved a solution of 10.0 of propionic acid chloride (0.11 mol) in 30 ml. of chloroform was added dropwise. After 20 minutes at room temperature, the chloroform phase was separated off, dried with potassium carbonate and concentrated. After addition of ether, crystals of 2-(N¹-propionyl-N²-phenylhydrazino) imidazoline separated out. Melting point 135°, with decomposition.

The following were prepared analogously:

2-[N¹-(4-chloro-butyryl)-N²-phenyl-hydrazino]-2-imidazoline, melting point 93–94°, with decomposition.
2-(N¹-lauroyl-N²-phenyl-hydrazino)-2-imidazoline, melting point 110°.
2-(N¹-stearoyl-N²-phenyl-hydrazino)-2-imidazoline, melting point 90°.
2-(N¹-acetyl-N²-phenyl-hydrazino)-2-imidazoline, melting point 131°, with decomposition.
2-(N¹-isobutyryl-N²-phenyl-hydrazino)-2-imidazoline, melting point 135°.
2-[N¹-(2,2-dipropyl-acetyl)-N²-phenyl-hydrazino]-imidazoline, melting point 110–12°.
2-(N¹-pivaloyl-N²-phenyl-hydrazino)-imidazoline, melting point 152–53°.
2-(N¹-methoxyacetyl-N²-phenyl-hydrazino)-imidazoline, melting point 144–45°.
2-(N¹-methylmercaptoacetyl-N²-phenyl-hydrazino)-2-imidazoline, melting point 110°.
2-(N¹-phenylacetyl-N²-phenyl-hydrazino)-imidazoline, melting point 128–29°.
2-[N¹-(4-methylbenzoyl)-N²-phenyl-hydrazino]-2-imidazoline, melting point 136°, with decomposition.
2-[N¹-(4-tert.-butyl-benzoyl)-N²-phenyl-hydrazino]-2-imidazoline, melting point 162–63°.
2-(N¹-anisoyl-N²-phenyl-hydrazino)-imidazoline, melting point 150°.
2-[N¹-(3,4-dichlorobenzoyl)-N²-phenyl-hydrazino]-2-imidazoline, melting point 118°.
2-[N¹-(2-chlorophenoxy)-acetyl-N²-phenyl-hydrazino]-2-imidazoline, melting point 135°.
2-(N¹-cyclopropylcarbonyl-N²-phenyl-hydrazino)-2-imidazoline, melting point 139°, with decomposition.
2-(N¹-cyclopentylcarbonyl-N²-phenyl-hydrazino)-2-imidazoline, melting point 138°, with decomposition.
2-(N¹-diethylacetyl-N²-phenyl-hydrazino)-2-imidazoline, melting point 156 to 158° C.
2-(N¹-cyclobutylcarbonyl-N²-phenyl-hydrazino)-2-imidazoline, melting point 128° C.
2-(N¹-cyclohexylcarbonyl-N²-phenyl-hydrazino)-2-imidazoline, melting point 139 to 141° C.
2-[N¹-(4-chlorophenylmercapto-acetyl)-N²-phenyl-hydrazino]-2-imidazoline, melting point 92° C.
2-(N¹-cinnamoyl-N²-phenyl-hydrazino)-2-imidazoline, melting point 142° C.
2-[N¹-(2-chlorobenzoyl)-N²-phenyl-hydrazino]-2-imidazoline, melting point 166 to 167° C.
2-[N¹-(3-chlorobenzoyl)-N²-phenyl-hydrazino]-2-imidazoline, melting point 147 to 148° C.
2-[N¹-(2,4-dichlorobenzoyl)-N²-phenyl-hydrazino]-2-imidazoline, melting point 159 to 160° C.
2-[N¹-(2,5-dichlorobenzoyl)-N²-phenyl-hydrazino]-2-imidazoline, melting point 131 to 132° C.
2-[N¹-(2-methylbenzoyl)-N²-phenyl-hydrazino]-2-imidazoline, melting point 176 to 177° C.
2-[N¹-(3-methylbenzoyl)-N²-phenyl-hydrazino]-2-imidazoline, melting point 148 to 149° C.
2-[N¹-(2-methoxybenzoyl)-N²-phenyl-hydrazino]-2-imidazoline, melting point 174 to 176° C.
2-[N¹-(2-chloro-6-methoxybenzoyl)-N²-phenyl-hydrazino]-2-imidazoline, melting point 214 to 215° C.
2-[N¹-(2-chloro-4-ethylmercapto-benzoyl)-N²-phenyl-hydrazino]-2-imidazoline, melting point 166 to 167° C.
2-[N¹-(3,4-dimethoxybenzoyl)-N²-phenyl-hydrazino]-2-imidazoline, melting point 144 to 146° C.
2-[N¹-(4-phenylbenzoyl)-N²-phenyl-hydrazino]-2-imidazoline, melting point 165° C.
2-[N¹-(naphthoyl-1)-N²-phenyl-hydrazino]-2-imidazoline, melting point 165° C.
2-(N¹-furoyl-N²-phenyl-hydrazino)-2-imidazoline, melting point 158° C.

EXAMPLE 2

A suspension of 25.7 g. of 2-(N²-phenylhydrazino)-2-imidazoline hydrobromide (0.1 mol) in 250 ml. of chloroform was mixed, under nitrogen, with 25 ml. of 45 percent strength sodium hydroxide solution and after complete dissolution a solution of 15.5 g. of benzoyl chloride (0.11 mol) in 30 ml. of chloroform was added dropwise over the course of 20 minutes. After a further 20 minutes at room temperature the chloroform phase was separated off, dried with potassium carbonate and concentrated to a small volume. Addition of ether led to crystals separating out and these were converted with hydrochloric acid in ether into the hydrochloride of 2-(N¹-benzoyl-N²-phenylhydrazino)-2-imidazoline, melting point 190°.

2-[N¹-phenylacetyl-N²-(2 - chlorophenyl)-hydrazino]-2-imidazoline hydrochloride was prepared analogously from 2-[N²-(2-chlorophenyl)-hydrazino] - 2 - imidazoline hydrobromide. Melting point 186°.

EXAMPLE 3

A solution of 17.6 g. of 2-(N²-phenylhydrazino)-2-imidazoline (0.1 mol )in 250 ml. of chloroform was treated, under nitrogen, with 9.2 g. of butyric acid (0.11 mol) and subsequently with a solution of 21.5 g. of dicyclohexylcarbodiimide in 50 ml. of chloroform. After 24 hours, the urea which had precipitated was filtered off, the filtrate was concentrated and the product precipitated with ether and petroleum ether. The solid was taken up in ethanol, insoluble matter was filtered off, the solution was concentrated and the product precipitated with ether/petroleum ether. Melting point 118°, with decomposition.

What is claimed is:

1. A compound selected from the group consisting of a phenylhydrazino-2-imidazoline of the formula:

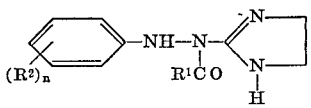

wherein $R^1$ is hydrogen, alkyl of 1 to 17 carbon atoms, unsubstituted or substituted by fluoro, chloro, bromo, hydroxy, lower alkoxy, lower alkylthio, phenyl or phenoxy; alkenyl of 3 to 10 carbon atoms; cycloalkyl of 3 to 6 carbon atoms; furyl; phenyl; phenoxy; naphthyl or a biphenyl, said phenyl and phenoxy being unsubstituted or substituted by fluoro, chloro, bromo, nitro, carboxy, lower alkanoyl, hydroxy, lower alkoxy, lower alkyl, lower alkenyl, arylamino, lower alkylamino, di(lower alkyl)amino or lower alkamido;

$R^2$ is hydrogen, fluoro, chloro, bromo, nitro, amino, carboxy, lower alkanoyl, hydroxy, lower alkoxy, lower alkyl or trifluoromethyl;

$n$ has a value of 1 to 3, and the physiologically acceptable acid addition salts thereof.

2. A compound according to claim 1 wherein $R^1$ is alkyl of 1 to 17 carbon atoms, unsubstituted or substituted by chloro, lower alkoxy, lower alkylthio, phenyl or phenoxy; cycloalkyl of 3 to 6 carbon atoms; phenyl; naphthyl; lower alkenyl of 3 to 10 carbon atoms; cycloalkyl of 3 to 6 carbon atoms; phenyl, biphenyl or naphthyl, said phenyl and phenoxy groups being unsubstituted or substituted by chloro, lower alkoxy, lower alkylthio or lower alkyl, and $R^2$ is hydrogen, chloro or lower alkyl.

3. A compound according to claim 1 wherein $R^2$ is hydrogen.

4. The compound according to claim 3 wherein $R^1$ is phenyl.
5. The compound according to claim 3 wherein $R^1$ is ethyl.
6. The compound according to claim 3 wherein $R^1$ is propyl.
7. The compound according to claim 3 wherein $R^1$ is 3-chloropropyl.
8. The compound according to claim 3 wherein $R^1$ is benzyl.
9. The compound according to claim 3 wherein $R^1$ is n-undecyl.
10. The compound according to claim 3 wherein $R^1$ is p-tert.butylphenyl.
11. The compound according to claim 3 wherein $R^1$ is 4-n-heptyl.
12. The compound according to claim 3 wherein $R^1$ is n-heptadecyl.
13. The compound according to claim 3 wherein $R^1$ is 3,4-dichlorophenyl.
14. The compound according to claim 3 wherein $R^1$ is methyl.
15. The compound according to claim 3 wherein $R^1$ is iso-propyl.
16. The compound according to claim 3 wherein $R^1$ is tert.-butyl.
17. The compound according to claim 3 wherein $R^1$ is 3-n-pentyl.
18. The compound according to claim 3 wherein $R^1$ is cyclopropyl.
19. The compound according to claim 3 wherein $R^1$ is cyclobutyl.
20. The compound according to claim 3 wherein $R^1$ is cyclopentyl.
21. The compound according to claim 3 wherein $R^1$ is cyclohexyl.
22. The compound according to claim 3 wherein $R^1$ is methoxymethyl.
23. The compound according to claim 3 wherein $R^1$ is methylmercaptomethyl.
24. The compound according to claim 3 wherein $R^1$ is p-chlorophenylmercaptomethyl.
25. The compound according to claim 3 wherein $R^1$ is phenethyl.
26. The compound according to claim 3 wherein $R^1$ is cinnamyl.
27. The compound according to claim 3 wherein $R^1$ is o-chlorophenyl.
28. The compound according to claim 3 wherein $R^1$ is m-chlorophenyl.
29. The compound according to claim 3 wherein $R^1$ is 2,4-dichlorophenyl.
30. The compound according to claim 3 wherein $R^1$ is 2,5-dichlorophenyl.
31. The compound according to claim 3 wherein $R^1$ is 2-methylphenyl.
32. The compound according to claim 3 wherein $R^1$ is 3-methylphenyl.
33. The compound according to claim 3 wherein $R^1$ is 4-methylphenyl.
34. The compound according to claim 3 wherein $R^1$ is 2-methoxyphenyl.
35. The compound according to claim 3 wherein $R^1$ is 2-chloro-6-methoxyphenyl.
36. The compound according to claim 3 wherein $R^1$ is 4-methoxyphenyl.
37. The compound according to claim 3 wherein $R^1$ is 2-chloro-4-ethylmercaptophenyl.
38. The compound according to claim 3 wherein $R^1$ is 3,4-dimethoxyphenyl.
39. The compound according to claim 3 wherein $R^1$ is naphthyl-(1).
40. The compound according to claim 3 wherein $R^1$ is furyl-(2).

(References on following page)

References Cited

UNITED STATES PATENTS 3,480,630  11/1969  Stahle et al. -------- 260—254
3,683,023  8/1972  Winter et al. ----- 260—564 F

OTHER REFERENCES

Adcock et al., J. Chem. Soc. 1965, pp. 474 to 479.

Bontempo et al., Antimicrobial Agents and Chemotherapy, 1961, pp. 795–801 (November 1961).

Siegler et al., J. Economic Entomology, vol. 39, pp. 416–417 (1946).

Gertler et al., U.S. Bureau of Entomology and Plant Quarantine Bulletin E–781, 10 pages, June 1949.

JOHN D. RANDOLPH, Primary Examiner

U.S. Cl. X.R.

424—273; 260—309.6